Patented May 19, 1953

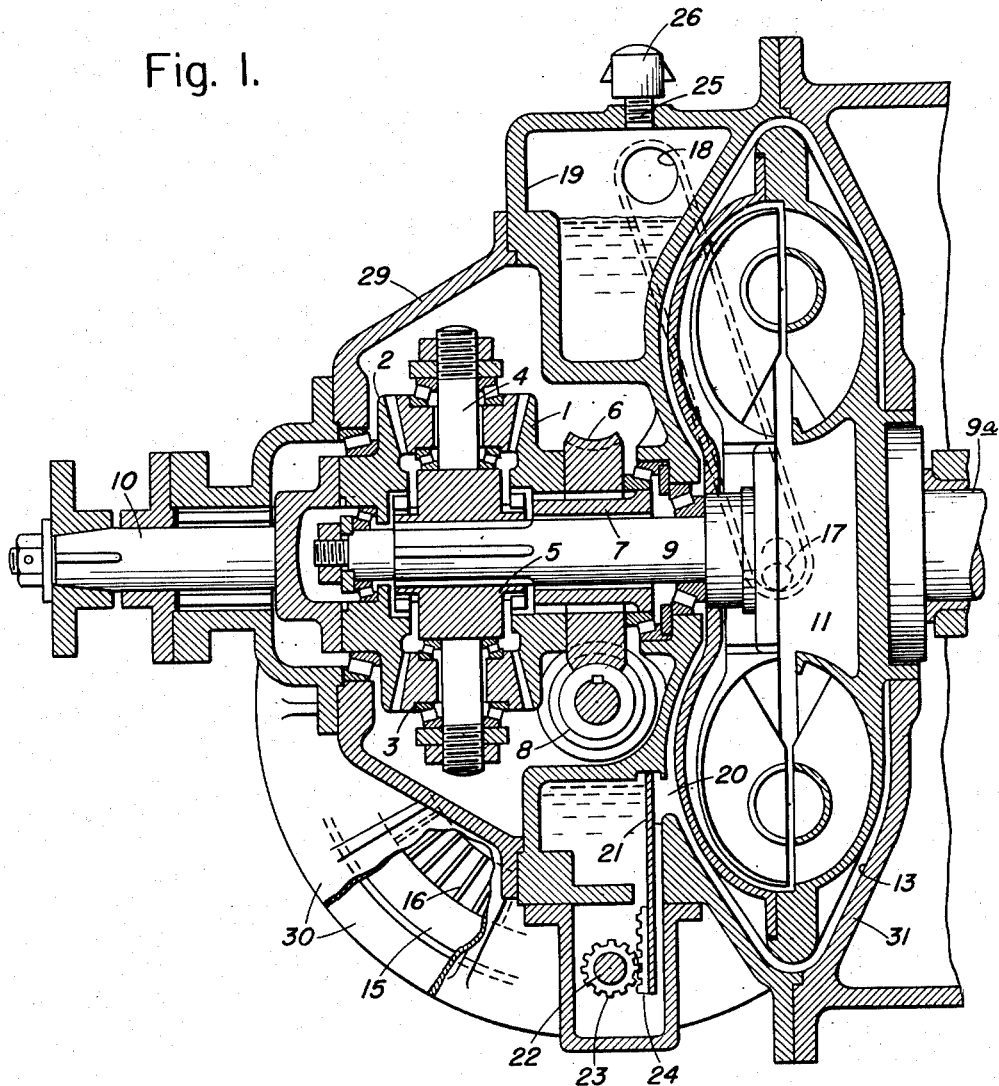

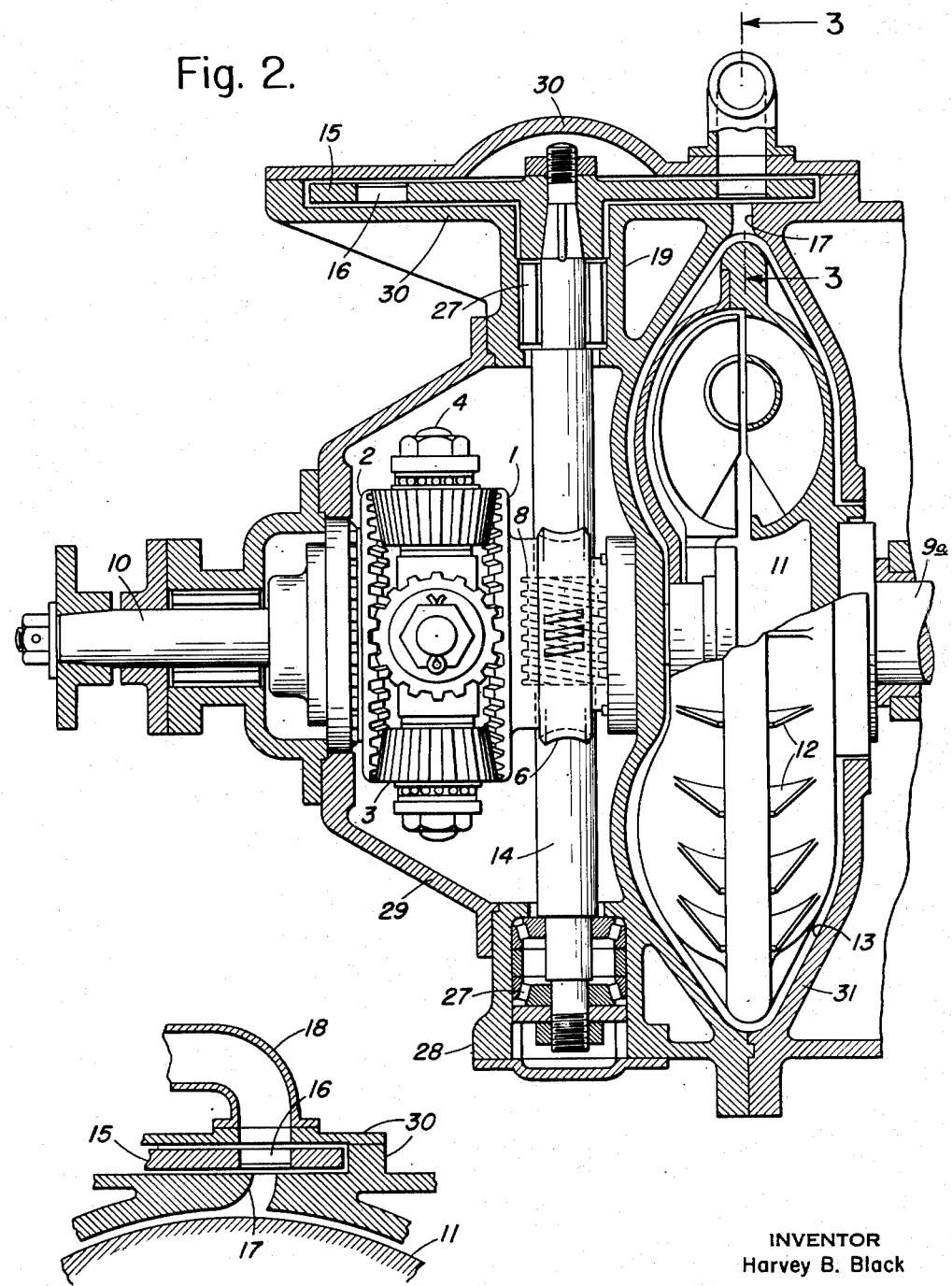

2,638,796

UNITED STATES PATENT OFFICE 2,638,796

VARIABLE-SPEED TRANSMISSION

Harvey B. Black, Bogota, N. J.

Application April 19, 1950, Serial No. 156,890

3 Claims. (Cl. 74—687)

This invention relates to a variable speed transmission adapted to transmit mechanical rotary motion from one shaft to another while effecting an infinitely variable ratio between the speeds of the two shafts. This transmission is adapted for use in an automotive vehicle to carry the power from the motor to the wheels. However, the device may be used wherever it is desired to vary the speed ratio between driving and driven rotary elements.

One of the objects is to provide a variable speed transmission which may be smoothly changed in ratio, either by manual or automatic control, yet which will provide for an overdrive ratio between the rotary elements controlled by the device. This has the advantage, when the transmission is in automotive vehicle use, of permitting a vehicle to start while using a low ratio and then, as the vehicle gains momentum, to gradually increase this ratio smoothly not only up to unity but on beyond this so as to effect an overdrive. Such an overdrive is desirable because it permits the use of lower motor operating speeds, as compared to the motor speed required with a unity ratio.

Another object is to provide a variable speed transmission, of the infinitely variable ratio type, that is simply designed and which uses relatively few parts. Attainment of this objective is advantageous from both the manufacturing and maintenance costs considerations. A further object is to provide an infinitely variable ratio transmission which will provide any desired ratio, in a stepless manner, by operation of a control, which operation may be either manually or automatically effected. Other objects may be inferred from the following:

A specific example of a variable speed transmission, of the type described, is disclosed hereinafter with the aid of the accompanying drawings. This is done for the purpose of explaining the principles and operation of the invention. Once these principles and operation are understood, those skilled in the art may apply them in other forms and using other details than are specifically involved by this particular example.

This example is illustrated by the accompanying drawings in which:

Fig. 1 is a vertical section;

Fig. 2 is a horizontal section; and

Fig. 3 is a section taken on the line 3—3 in Fig. 2 to show certain details.

In this specific example, there is an epicyclic gear train having two sun gears 1 and 2 in the form of bevel gears that are axially aligned so as to face each other and having equal diameters and numbers of teeth. A plurality of planet gears 3 intergear the sun gears 1 and 2. These planet gears are in the form of bevel pinions of equal diameters and numbers of teeth respecting each other. The train arms of these planet gears 3 are provided by shafts 4 which radiate from a hub 5, the latter being rotative and the planet gears being rotatively mounted on these shafts.

A worm gear wheel 6 is connected with the sun gear 1 through both gears being in splined connection with a common rotative hub 7. This causes the sun gear 1 and the worm gear wheel 6 to turn together as one. A worm gear screw 8 is meshed with the worm gear wheel 6. This screw 8 has a pitch frictionally locking this wheel 6 from turning this screw. In other words, the screw 8 has a pitch that is less than the critical angle of friction which would permit the worm gear wheel 6 to rotate the screw 8 under the maximum torque that the sun wheel 1 carries when the transmission is working.

A power input shaft 9 extends through the hub 7, the latter being freely rotative relative to this shaft. The shaft 9 continues through the hub 5 with which it is in splined connection.

This shaft 9 receives the rotary power input, and when it does it rotates the train arms, formed by the hub 5 and shafts 4, and, therefore, causes the planet gears 3 to revolve. When the screw 8 is rotated the sun gear 1 is permitted to rotate. When the sun gear 1 turns at twice the rotary speed of the hub 5 and shafts 4, the sun gear 2 remains stationary. As the speed of the screw 8 is slowed down, the sun gear 1 must also slow down and, so, the sun gear 2 is caused to rotate, with its rotary speed increasing as the speed of the screw 8 decreases. When the rotation of the screw 8 is stopped entirely the sun gear 2 is driven at twice the rotative speed of the input power shaft 9. Thus the device effects a variable speed drive, depending on the rotative speed of the screw 8. Power is taken from the device through a power output shaft 10 that is connected with the sun gear 2 so as to be driven thereby.

Attention is called to the fact that the only power that must be used to rotate the screw 8, is the small amount of power required to overcome the friction between the screw 8 and the worm gear wheel 6. The pitch of the screw 8 may be made to provide an angularity less than the critical friction angle when the worm gear is lubricated. This worm gearing functions as an anchor for the sun gear 1 and provides for moving this anchor at varying degrees of rotating velocities, as is required to produce the desired speed ratio between the shafts 9 and 10.

As shown by the drawings, a fluid clutch 11 is interposed in the power input shaft 9 so that the latter drives through this clutch. This fluid clutch is of a prior art type having a rotary external housing. This fluid clutch slips more or less depending on the rotative speed of the section 9a of the input shaft 9 which directly receives rotary power. This is the right-hand section in the drawings, and this is the section that is arranged in rigid mechanical connection with the external housing of the fluid clutch, in accordance with this invention.

Although this fluid clutch is illustrated as having a prior art internal construction, its rotary external housing is distinctive in that it is provided with a plurality of radial blades 12. Furthermore, the entire clutch assembly is housed in a chamber 13 enclosing the external housing of the clutch 11 and the blades 12 and providing a confining fluid-tight enclosure therearound. This enclosure may be filled with liquid so that the described arrangement provides a centrifugal pump, any suitable rotary shaft seals being used at the necessary shaft holes. Due to the naturally large diameter of the external housing of the clutch 11, this pump is capable of moving large volumes of liquid at high velocities.

The worm gearing screw 8 is keyed to a shaft 14 that extends transversely of the transmission to a point beyond the periphery of the chamber 13. There the shaft is keyed to a hydraulic turbine disk 15 having blades 16, and this disk is large enough in diameter so that its blades 16 transversely overlie the periphery of the chamber 13. In registration with these blades 16, the chamber 13 has a nozzle outlet 17 through which liquid is driven by the blades 12, through the turbine blades 16 and into an exhaust conduit 18. This exhaust conduit extends to a liquid storage chamber 19 having sufficient capacity to function as a header. This storage chamber 19 has a portion located at a high point of the transmission to provide an adequate hydraulic head.

The chamber 19 is shown as comprising an annulus arranged in a vertical plane around the worm gearing. The bottom of this annulus connects with the pump chamber 13 by way of an inlet 20 provided with a sliding valve 21 controlled by a shaft 22 which turns a gear pinion 23 meshed with a gear rack 24 fixed to the sliding valve 21.

A filling opening 25 is located in the top of the chamber 19, and this opening is closed by a plug 26. A suitable hydraulic liquid is loaded through this opening 25 into the storage chamber 19 so as to bring the liquid level well up towards the top of this storage chamber when the valve 21 is closed and the chamber 13 is empty or practically so. When the valve 21 is opened, the liquid floods into the chamber 15 and surrounds the centrifugal pump blades 12 excepting for the uppermost ones.

In operation, assuming the liquid to be loaded as described, a motor, presumably, turns the shaft 9 through the fluid clutch 11. The right-hand section 9a of the shaft 9 is solidly connected to the external housing of the fluid clutch 11 and so turns this housing at full speed regardless of clutch slippage.

With the valve 21 wide open the centrifugal pump blades 12 drive the liquid through the nozzle 17 so as to power the turbine disk 15 at maximum rotative speed, thus turning the screw shaft 14 and, of course, the screw 8, at high rotative speeds. Therefore, the worm gear wheel 6 permits the sun gear 1 to rotate at high rotative speeds. As previously described, when the rotative speed of the sun gear 1 is permitted to equal the rotating speed of the epicyclic gearing train arm the output shaft 10 does not turn.

Now by gradually closing the valve 21, as by manually turning the shaft 22, the flow of liquid from the hydraulic chamber 19, required to feed the centrifugal blades, is gradually diminished. This causes the rotative speed of the turbine disks 15 to correspondingly slow down, thus slowing the rotative speed of the sun gear 1 correspondingly and thus decreasing the speed ratio between the shafts 9 and 10. When the valve 21 is fully closed the chamber 13 becomes empty and the turbine disk 15 ceases to rotate. At that time there is an overdrive between the shafts 9 and 10, the shaft 10 turning twice for each rotation of the shaft 9.

Due to the pitch of the worm gearing wheel 6, required to frictionally lock the worm gear wheel 6 so as to anchor the sun gear 1, this screw 8 must be turned at extremely high rotative speeds to actually stop the shaft 10 from rotating. However, if, when the valve 21 is fully opened, the shaft 10 continues to revolve, any material load on this shaft 10 will cause the fluid clutch 11 to slip in its customary manner, assuming the speed of the right-hand section 9a of the shaft 9 to be low at this time. As a result, when the device is applied to an automotive vehicle, it becomes possible to stop the vehicle by permitting the motor to idle and using the slippage of the fluid clutch 11. Less slippage than ordinary is required because of the low ratio that will naturally exist between the speeds of the shafts 9 and 10 with the valve 21 fully open. When the motor is speeded up to start the drive, the speed of the turbine disk 15 also is increased, because of the higher velocity of the liquid passing through the nozzle 17. This further increases the ratio while, at the same time, causing a more positive engagement of the fluid clutch 11.

The various elements may be housed and journaled in a manner similar to that ordinarily practiced in the case of ordinary transmission devices. All of the gear elements may be encased so that they can operate in a fluid lubricant bath. These constructional details are considered to be well within the abilities of those skilled in the art of designing rotary transmissions. Therefore, it is considered appropriate to highlight only a few of these constructional details.

The shaft 14 is shown as being journaled by anti-friction bearings 27 at both ends. The bearing for the shaft end remote from the turbine disk 15, is mounted by a housing 28 formed in the side of the transmission casing 29. The bearing at the end adjacent the disk 15, is mounted by the turbine casing 30 which is applied to one side of the casing 29. This casing 30 serves to confine the liquid used to propel the turbine disk. The conduit 18 is illustrated as being an external conduit running from the exhaust part of the casing 30 up to the top of the annular chamber 19. This chamber 19 is shown as being formed by making the transmission casing 29 with a cored annular space. Castings are used for these casing elements.

One side of the chamber 13 is provided by proper shaping of the transmission casing 29, while its other side is shown provided by a separate casing element 31 which may be considered as part of the crank casing of a motor or engine providing the section 9a of the power input shaft 9 which is solidly connected with the outer housing of the fluid clutch 11. Suitable rotary shaft seals may be used wherever necessary to seal in the hydraulic liquid and the fluid lubricant.

I claim:

1. A variable speed transmission including, in combination, an epicyclic gear train having two sun gears, a planet gear intergearing these sun gears, and a train arm mounting this planet gear; a shaft, means connecting said shaft with said train arm, a worm gear wheel connected with one of said sun wheels, a worm gear screw meshed with said gear wheel and having a pitch frictionally locking this wheel from turning this screw, a power output shaft connected with the other of said sun gears, a liquid centrifugal pump connected with and rotated by said shaft, a turbine connected with and rotating said screw, means conducting liquid from the output of said pump to said turbine, a liquid storage chamber connected with the exhaust of said turbine, and a flow-control valve connecting said chamber with the intake of said pump.

2. A variable speed transmission including, in combination, an epicyclic gear train having two sun gears, a planet gear intergearing these sun gears, and a train arm mounting this planet gear, a shaft, means connecting said shaft with said train arm, a worm gear wheel connected with one of said sun wheels, a worm gear screw meshed with said gear wheel and having a pitch frictionally locking this wheel from turning this screw, a power output shaft connected with the other of said sun gears, a liquid centrifugal pump connected with and rotated by said shaft, a turbine connected with and rotating said screw, means conducting liquid from the output of said pump to said turbine, a liquid storage chamber connected with the exhaust of said turbine, and a flow-control valve connecting said chamber with the intake of said pump, said pump being formed by an assembly including a fluid clutch connected to said shaft and of the type having a rotary external housing, blades fixed to said housing and providing the impeller for said pump, and a chamber enclosing said housing and blades and providing a confining enclosure therearound and providing the casing for said pump.

3. A variable speed transmission including two sun gears, a planet gear intergearing said sun gears and having a train arm, a shaft, means for connecting said shaft to said arm, a worm gear wheel connected to one of said sun gears, a worm gear screw meshed with said worm gear wheel, a power output shaft connected to the other of said sun gears, a fluid pump connected to the first-named shaft, a fluid actuated motor connected to said worm gear screw, means for conducting fluid from said pump to said motor, and means for controlling the flow rate of said fluid.

HARVEY B. BLACK.

References Cited in the file of this patent

UNITED STATES PATENTS

| Number | Name | Date |
|---|---|---|
| Re. 19,428 | Salerni | Jan. 15, 1935 |
| 1,077,454 | Cooke | Nov. 4, 1913 |
| 1,855,222 | Chase | Apr. 26, 1932 |
| 2,156,372 | Campbell | May 2, 1939 |
| 2,259,823 | Locke | Oct. 21, 1941 |
| 2,266,085 | Sanderson | Dec. 16, 1941 |
| 2,291,928 | Streich | Aug. 4, 1942 |